(12) United States Patent
McCandless

(10) Patent No.: US 6,189,517 B1
(45) Date of Patent: Feb. 20, 2001

(54) INTERNAL COMBUSTION ENGINE WITH LOW VISCOSITY FUEL SYSTEM

(75) Inventor: James C. McCandless, Grosse Pointe, MI (US)

(73) Assignee: AVL Powertrain Engineering, Inc., Plymouth, MI (US)

( * ) Notice: Under 35 U.S.C. 154(b), the term of this patent shall be extended for 0 days.

(21) Appl. No.: 09/022,891

(22) Filed: Feb. 12, 1998

(51) Int. Cl.[7] .............................. F02M 21/02; F02B 43/00
(52) U.S. Cl. ............................................. 123/529; 123/525
(58) Field of Search ................................... 123/525, 527, 123/529, 467, 516, 518, 519

(56) References Cited

U.S. PATENT DOCUMENTS

| | | | | |
|---|---|---|---|---|
| 3,651,794 | * | 3/1972 | Douglas | 123/529 |
| 3,698,367 | * | 10/1972 | Goodwin | 123/529 |
| 4,721,078 | * | 1/1988 | Watanabe et al. | 123/529 |
| 5,421,161 | * | 6/1995 | Gustafson | 123/527 |
| 5,509,393 | * | 4/1996 | Leaf et al. | 123/529 |
| 5,690,078 | * | 11/1997 | Ofner | 123/529 |
| 5,755,210 | * | 5/1998 | Sato et al. | 123/529 |

* cited by examiner

Primary Examiner—Thomas N. Moulis
(74) Attorney, Agent, or Firm—Watson Cole Grindle Watson, P.L.L.C.

(57) ABSTRACT

A pressurized fuel tank maintains fuel in its liquid phase and is connected to a fuel pump providing fuel to an accumulator. Control valves control fuel flow to injectors feeding fuel to combustion cylinders. When the engine is shut down, one way check valves connected between the control valves and the injectors close to seal the injectors from the control valves; and at the same time, a dump valve opens to connect the injectors to an adsorber device while an air inlet valve also opens to connect the adsorber device to the engine air inlet. When the engine is restarted, the check valves open and the dump valve and air inlet valve close. Subsequently, a purge valve opens to connect the adsorber device to a source of purge air, while the air inlet valve opens simultaneously. A purge process then occurs, whereupon the purge valve and air inlet valve simultaneously close, and the engine operates with the dump valve, the air inlet valve and the purge valve in closed position until the engine shuts down again.

14 Claims, 3 Drawing Sheets

INTERNAL COMBUSTION ENGINE WITH LOW VISCOSITY FUEL SYSTEM

BACKGROUND OF THE INVENTION

The present invention relates to internal combustion engines, such as used in vehicles, and more particularly direct injected compression-ignition (CI) engines using clean low viscosity fuels such as dimethyl ether (DME) to achieve ultra-low emissions of oxides of nitrogen and particulate matter.

The background of air pollution problems caused especially by internal combustion engines in trucks and buses as well as proposed solutions to such problems are set forth in detail in my U.S. Pat. No. 5,816,228, entitled FUEL INJECTION SYSTEM FOR CLEAN LOW VISCOSITY FUELS, the disclosure of which is incorporated herein by reference. One promising solution involves the use of DME as an alternative fuel for CI engines. However, conventional fuel systems are not suitable for use with DME because of the low viscosity of such a fuel. As disclosed in U.S. Pat. No. 5,816,228, a pressurized fuel storage tank is required, as well as a special pressurized fuel injection system.

A major problem with using DME is internal leakage of DME within the fuel injection system of a CI engine. In the fuel injection system as disclosed in U.S. Pat No. 5,816,228, DME is supplied under pressure to an accumulator, also called a common rail, and then is fed through a solenoid operated control valve to a fuel injector. When the engine is shut down, fuel can leak from the accumulator to the fuel injectors since the control valves are of the spool type. The fuel injector nozzle valves are precision steel valves, but they form imperfect seals for DME. Accordingly, when the engine is shut down, fuel can also pass through the fuel injector nozzle valves over a period of time and enter the associated combustion cylinders of the engine which is not acceptable. Accordingly, leakage from the accumulator to the fuel injectors must be prevented.

Even if means is provided for effectively preventing DME from leaking from the accumulator into the fuel injectors after the engine is shut down, a small volume of fuel will be trapped in the injectors upon engine shut down which could eventually leak into the combustion chambers of the engine. This type of leakage must also be prevented.

SUMMARY OF THE INVENTION

The invention incorporates a novel fuel tank which utilizes a fuel such as DME as the fuel to be pumped, and a second fluid such as propane as a pumping medium. The vapor pressure of the propane is higher than the vapor pressure of the DME to thereby cause the DME to be under substantially constant pressure by the propane at any particular ambient temperature over a wide range of ambient temperatures. This arrangement ensures that the DME will be maintained in its liquid phase. The fuel injection system of the present invention is similar to that shown in U.S. Pat. No. 5,816,228 except that a leakage control system is provided in the present invention for solving the leakage problems occurring with the system shown in said application.

In the present invention, the leakage control system includes a novel check valve for preventing fuel from leaking from the accumulator to any fuel injector when the engine is shut down and the pressure of the liquid fuel in the accumulator drops below a predetermined level. This check valve utilizes a soft, high strength ball which conforms to the valve seat of the check valve and provides a pressure-tight seal. The ball is urged toward its closed position by a piston which engages the ball. The piston is biased by resilient means in the form of a spring in a direction to cause the ball to engage the valve seat. The ball has a diameter and the piston has a face which is circular and has a diameter greater than the diameter of the ball.

The construction of the check valve is such that it has a very high opening pressure and a relatively low closing pressure. When the check valve is seated, the fuel pressure acts on a relatively small area of the ball, and when the ball initially lifts off of the seat, the fuel will act on the end of the piston which causes the total area acted on by fuel to be suddenly increased thereby causing the check valve to open rapidly to its full open position.

The check valve is always in its wide open position when the engine is running; and the only time the valve closes is when the engine is shut down. Therefore, the check valve has only very limited mechanical cycles of about 30,000 cycles between engine overhauls, so that the valve should last indefinitely.

The leakage control system of the invention also includes means for handling the small amount of fuel trapped in the fuel injectors when the engine is shut down. An adsorber means comprises a container filled with a material such as activated charcoal, the container having an inlet and an outlet. When the engine is shut down and the check valves have closed, the fuel injectors are connected to the inlet of the container, and the outlet of the container is simultaneously connected to the air inlet of the engine. Fuel vapors trapped in the fuel injectors then flow into the container and are adsorbed by the charcoal.

When the engine is restarted, the fuel injectors are disconnected from the inlet to the container and the outlet of the container is simultaneously disconnected from the air inlet of the engine. After a time delay when the associated vehicle is not moving, the inlet of the adsorbing means is connected to a source of purge air, and the outlet of the adsorbing means is simultaneously connected to the air inlet of the engine. The purge air flows into the container and purges the adsorbed fuel vapors which flow into the engine air inlet where they are burned. This purge process continues for a short period of about two to five minutes whereupon the source of purge air and the engine air inlet are simultaneously disconnected from the adsorber means.

The leakage control system then remains inactive while the engine is running until the engine shuts down again, whereupon the leakage control system recycles through the sequence of steps described above.

Thus, the leakage control system effectively overcomes the leakage problems in a DME fueled IC engine.

DESCRIPTION OF THE PREFERRED EMBODIMENT

Figure 1:
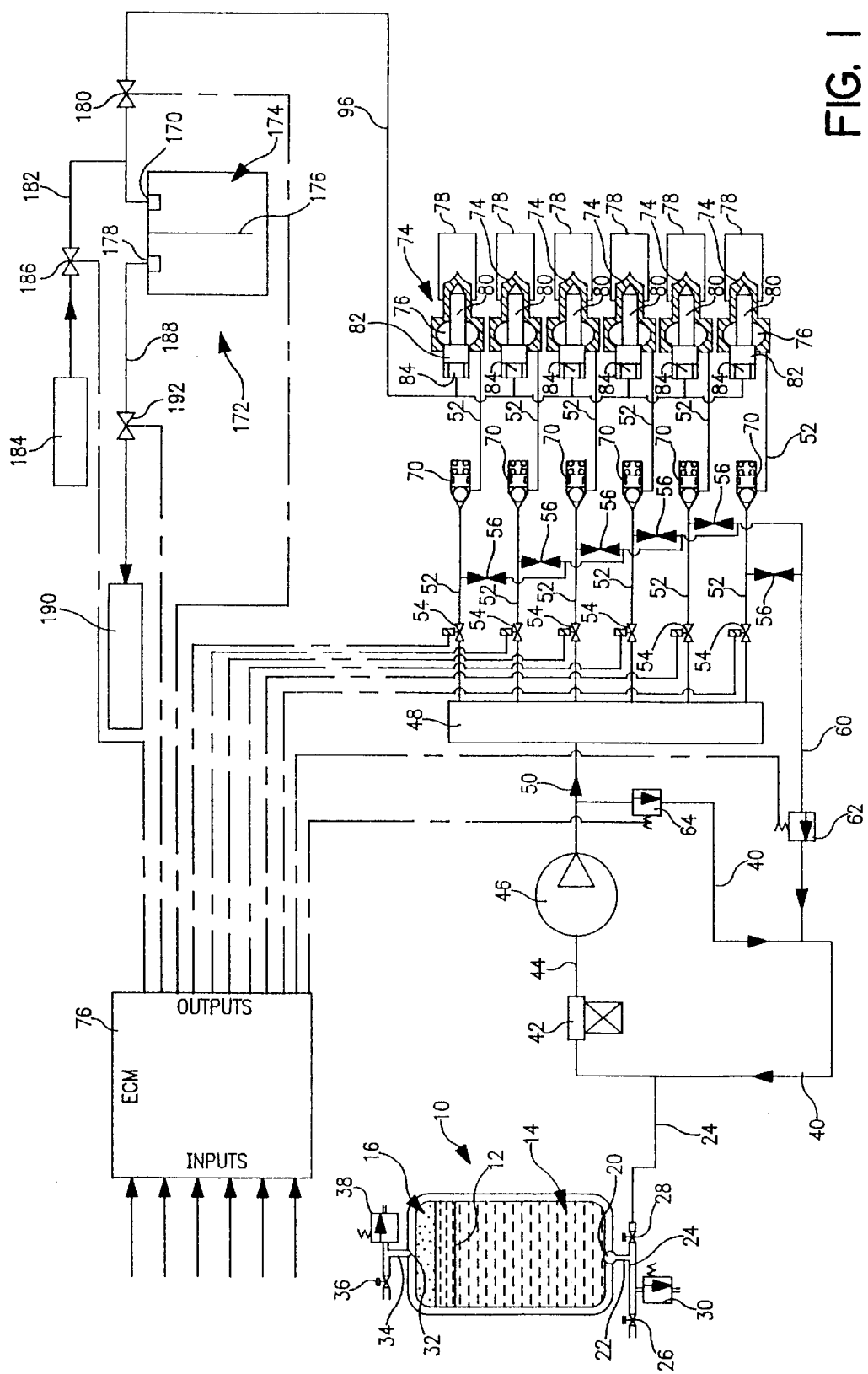
FIG. 1 is a schematic view of the fuel system of a direct injected CI engine.

Referring to the drawings wherein like reference characters designate corresponding parts throughout the several views, FIG. 1 illustrates schematically the entire fuel system of the engine. A pressurized fuel tank 10 is divided into two chambers by a flexible diaphragm 12. The lower chamber 14 is filled with liquid DME; and the upper chamber 16 is filled with a fluid such as propane having a vapor pressure higher than the vapor pressure of the DME. The propane is in both its gaseous state as indicated by dots and its liquid state as indicated by horizontal lines. The DME is under substantially constant pressure by the propane at any particular ambient temperature over a wide range of ambient temperatures; and the DME is maintained in its liquid phase.

The details of construction and mode of operation of the pressurized fuel tank are disclosed in my copending U.S. Pat. application Ser. No. 09/022,894 filed concurrently herewith and entitled CONSTANT PRESSURE THERMODYNAMIC PUMP, the disclosure of which is incorporated herein by reference.

A port 20 is provided at the bottom of the tank and a conduit 22 is in communication with the port. Conduit 22 is connected to a further conduit 24. A conventional fill valve 26 and a conventional shutoff valve 28 are connected in conduit 24. A conventional safety relief valve 30 is also connected in conduit 24. A port 32 is provided at the top of the tank; and a conduit 34 is in communication with the port. A fill valve 36 and a safety relief valve 38 are connected to conduit 34.

The conduits in the rest of the fuel system are schematically illustrated by solid lines. Conduit 24 is connected to a conduit 40 which is connected to the inlet of a conventional fuel filter 42 which is adapted to filter out particles which are about 10 microns or larger in size. The outlet of the filter is connected by conduit 44 to the inlet of an engine driven fuel pump 46 of a special construction suitable for pumping DME as disclosed in U.S. Pat. No. 5,816,228. The pump raises the fuel pressure and delivers it to the accumulator or common rail 48 through a conduit 50. The fuel pressure from the pump is in the range of 110 to 220 bar depending on engine speed/load.

It is assumed that the CI engine has six cylinders. Accordingly, six similar conduits 52 are connected to the output of the accumulator, and an electronically operated solenoid control valve 54 is connected in each of conduits 52. Each of conduits 52 is also connected by a conventional restrictor 56 to a conduit 60 comprising a short circuit line which is connected to a back pressure regulator valve 62 which is in turn connected with the low pressure return conduit 40 connected to the input of the pump. A rail pressure modulator valve 64 is also connected by conduit 40 to the outlet of the pump to control the output pressure of pump 14 and thus determine the pressure of DME in common rail or accumulator 48. Valve 64 also functions as a relief valve to prevent DME from being pumped to the accumulator at excessive pressure. This mode of operation is fully disclosed in U.S. Pat. No. 5,485,818, the disclosure of which is incorporated herein by reference.

A plurality of novel check valves 70 are connected in each of conduits 52; and conduits 52 are connected to fuel passages in injectors 74. The details of construction of the check valves and injectors 74 are described in more detail hereinafter.

An electronic control module (ECM) 76 includes a microprocessor that received inputs from various engine monitors such as fuel temperature, fuel rail pressure, throttle position, engine revolutions per minute and cam angle. The outputs from the ECM to various components of the fuel system are indicated by dashed lines. The ECM is programmed with the operating strategy of the fuel system and controls the operation of the entire fuel system. Engine conditions such as oil temperature, ambient air temperature, barometric pressure and exhaust back pressures are monitored and fed to the ECM. The ECM computes output control signals that are sent to engine components such as the control valves 54 to actuate the valves at a precise time in the engine operating cycle. The output control signals sent to the valves 54 determine the time for starting fuel injection and the duration of each injection.

The output signals from the ECM to rail pressure regulator valve 64 represents the desired rail pressures for the specific engine conditions calculated according to the operating strategy of the system and in response to the data collected by the various monitors. The ECM is also programmed to compute desired back pressures for the back pressure regulator valve 62 and conveys signals to valve 62.

Each of injectors 74 is of substantially the same construction as the injectors disclosed in U.S. Pat. No. 5,816,228 wherein the fuel passage of each injector is in communication with an injector inlet cavity. The construction of the injector is such that the fuel that leaks past a control valve 54 to associated injector is utilized to force the injection nozzle to a closed position.

When the check valves are open, as when the engine is running, the short circuit line conduit 60 is in communication through conduits 52 and the check valves 70 with the inlet cavities 76 of the injectors. The restrictors 56 resist flow of fuel to conduit 60. The back pressure regulator valve 62 is set to open at a pressure that is less than the valve opening pressure of the injector nozzle. Valve 62 is controlled by the ECM to open and allow fuel flow to conduit 40 at selected pressures which are always lower than the opening pressure of the fuel injector. Accordingly, fuel leaking past control valves 54 never reach the valve opening pressure of the fuel injectors.

When a control valve 54 opens, fuel flows to a fuel injector and the inlet cavity thereof to cause the injector nozzle to open and fuel is injected into a combustion cylinder. As seen in FIG. 1, each of the fuel injectors 74 opens into an associated combustion cylinder 78. The high pressure fuel is restricted for a sufficient time by restrictors 56 to permit fuel injection to occur.

Each fuel injector 74 has an injector nozzle including a nozzle pin 80 and a piston-like portion 82. Portion 82 slides in a cylindrical bore formed in the injector body. There is a clearance between the outer surface of portion 82 and the surface of the bore which allows pressurized liquid fuel to flow from the inlet cavity 76 to a spring cavity 84 which contains a compression spring normally biasing the nozzle to closed position. The end surface of portion 82 facing cavity 84 is greater than the end surface of portion 82 facing inlet cavity 76. Accordingly, when fuel leaks into cavity 84, because of the difference in areas of the end surfaces on opposite sides of portion 82, the nozzle will be maintained in its closed position.

Figure 3:
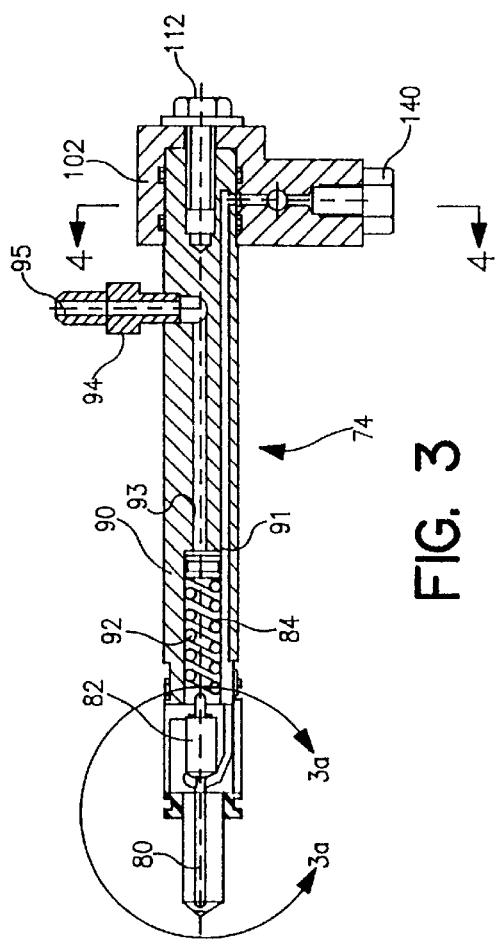
FIG. 3 is a view taken along line 3—3 of FIG. 2 showing the fuel injector and check valve housing in section.

Referring to FIG. 3, a fuel injector 74 is illustrated. A cylindrical body 90 includes an inlet passage 91 extending longitudinally thereof. A coil spring 92 having a relatively low rate of about 50 pounds per inch is disposed within cavity 84. A passage 93 within body 90 is in communication with one end of cavity 84, and is in communication with a fitting 94 having a bore 95 formed therethrough. Fitting 95 is connected to a conduit 96 as seen in FIG. 1 which in turn is connected to leakage control system components hereinafter described.

Figure 3A:
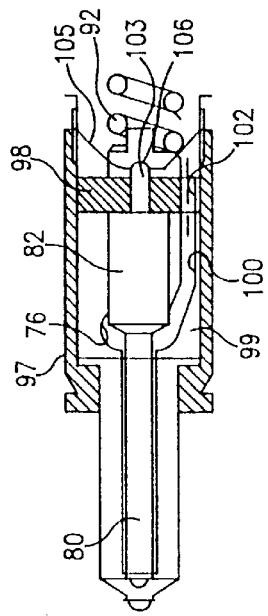
FIG. 3a is an enlarged view of portion 3a—3a of FIG. 4.

As seen in FIG. 3a, a cup-shaped nut 97 is threaded on the left hand end of body 90 and piston-like portion 82 of nozzle pin 80 is slidably mounted within the nut. A stop plate 98 is mounted within the cup for limiting movement of the nozzle pin to the right as seen in the figure. Piston-like portion 82 has a clearance within body of material 99 which has inlet cavity 76 formed therein as well as a passage 100 which connects the inlet cavity with a hole 102 formed through the stop plate. Hole 102 is aligned with passage 91 so that fuel may flow to inlet cavity 76. Piston-like portion 82 has an extension 103 which extends through a hole 104 and has a clearance therewith so that fuel may flow from cavity 76 into cavity 84. Spring 91 rests on a generally concave spring seat 105 which has a depression 106 formed therein for receiving a complementary shaped end of extension 103 therein.

It is noted that the portion of the fuel system connected between the pressurized fuel tank and the conduit 96 of the present invention is similar in construction and function to that of U.S. Pat. No. 5,816,228 with the exception of the check valves 70 which form a portion of the leakage control system of the present invention.

Figure 4:
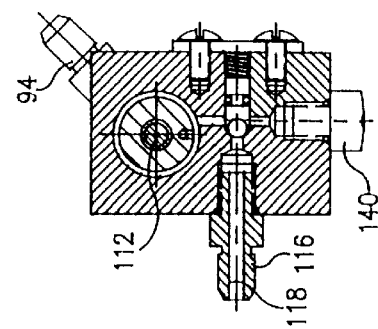
FIG. 4 is a sectional view taken along line 4—4 of FIG. 3.
Figure 2:
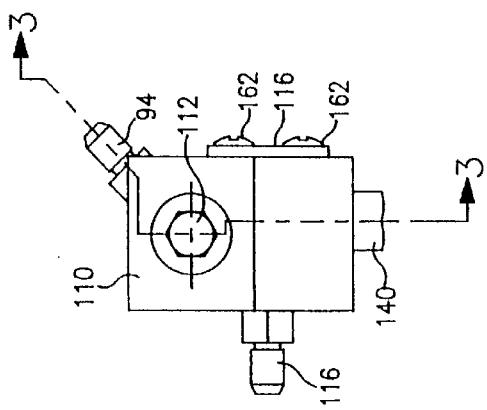
FIG. 2 is an end view of a check valve housing mounted on a fuel injector according to the invention.

Referring to FIGS. 2–4, the novel check valve construction of the invention is mounted within a housing 110 which has a cavity therein receiving one end of the fuel injector 74. The housing is bolted to the end of body 90 with a bolt 112 which passes through a suitable hole formed in housing 110 and is threaded into a suitable threaded bore provided in the end of body 90. A fitting 116 having a bore 118 formed therethrough is threaded into a threaded bore formed in housing 110, fitting 116 being connected to a conduit 52 for receiving fuel from accumulator 48.

Figure 5:
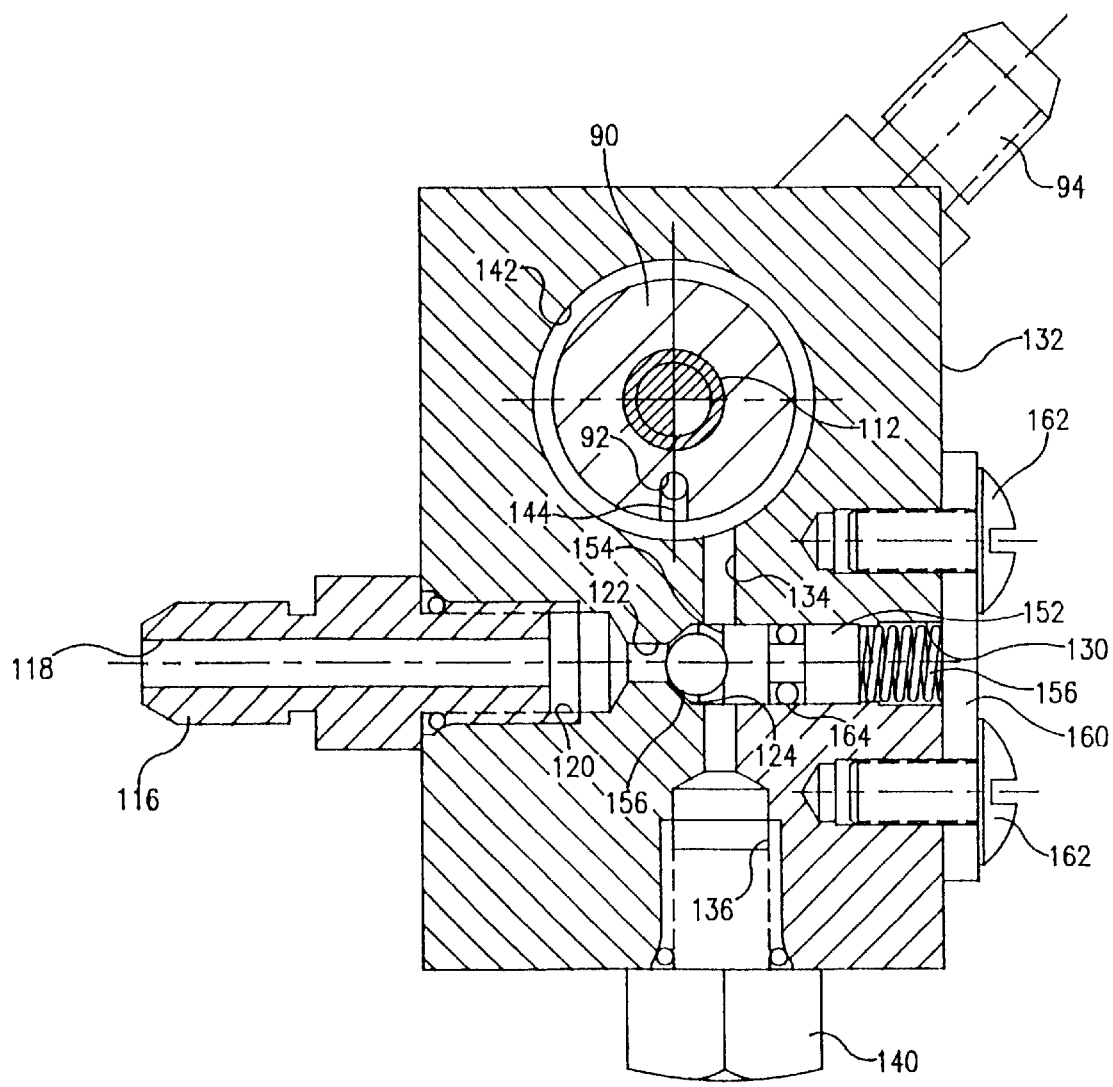
FIG. 5 is an enlarged view of FIG. 4.

Referring to FIG. 5, the inner end of bore 118 opens into a bore 120 formed in the housing. Bore 120 is in communication with a bore 122 of smaller diameter which is in communication with a valve seat 124 formed in the housing. The valve sealt opens into a cylindrical bore 130 of larger diameter which opens at face 132 of the housing. A cylindrical bore 134 of smaller diameter extends normal to and intersects bore 130. At its lower end as seen in FIG. 5, bore 134 joins with a bore 136 of larger diameter which is internally threaded. A plug 140 is threaded into bore 136 to close off the lower end of the bore. The upper end of bore 134 is in communication with an internal groove 142 formed in housing 110. Groove 142 is in communication with a bore 144 which in turn is in communication with inlet passage 92 formed in injector body 90.

A ball 150 is formed of a soft, high strength plastic such a VESPEL which conforms to valve seat 124 and provides a pressure-tight seal when the ball is seated on the valve seat. A piston 152 is slidably mounted in bore 130 and has a face 154 which engages ball 150. The ball has a given diameter, and face 154 is circular and has a diameter greater than the diameter of the ball. The piston is urged to the left as seen in FIG. 5 by a compression spring 156 which is in engagement with a retainer plate 160. The retainer plate is held in position by a plurality of threaded screws 162 which pass through holes in the retainer plate and are threaded into suitable threaded holes in the housing.

Piston 152 has an annular groove formed at the medial portion thereof, and a conventional O-ring 164 is mounted in the groove for providing a seal with bore 130. In operation, the valve has a very high opening pressure and a relatively low closing pressure. It is apparent that when the ball is seated, fuel pressure acts only a limited area of the ball, but when the ball lifts off of the valve seat, the fuel pressure acts on face 154 of the piston which has a greater area which is acted on by the fuel pressure, thereby causing the check valve to open rapidly.

While the check valves are shown as being mounted on the fuel injectors, the check valves may also be mounted on the accumulator if desired.

Referring again to FIG. 1, conduit 96 is connected to the inlet 170 of adsorber means 172 which may be in the form of a metal container filled with an adsorbing substance such a activated charcoal 176. A baffle 174 extends down the center of the container to cause fuel vapors entering through inlet 170 to flow through the maximum amount of charcoal before reaching the outlet 178 of the adsorber means. A dump valve 180 is connected in conduit 96 for controlling the flow of fuel vapors from the cavities 84 in the fuel injectors to container 172.

A conduit 182 is also connected to inlet 170 of the adsorber means, conduit 182 being connected to a source oil purge air 184 which is high pressure air. The high pressure air source may comprise the engine's turbocharger or the air brake system such as used in trucks. A purge valve 186 is connected in conduit 182 for controlling the flow of purge air to the inlet of the adsorber means.

The outlet 178 of the adsorber means is connected by a conduit 188 to the air inlet 190 of the engine. An air inlet valve 192 is connected in conduit 186 for controlling the flow of fuel vapors from the adsorber means to the air inlet of the engine.

Each of valves 180, 186 and 192 are solenoid operated valves which are electrically connected to the ECM for operation in a programmed sequence upon starting and stopping the engine as discussed below.

The activated charcoal adsorber may be replaced by a commercially available zeolite based molecular sieve which can be used to adsorb DME. The sieve could be purged by circulating hot coolant around the zeolite adsorber.

When the engine is operating, check valves 70 are in their full open position, and valve 180 is closed so that no fuel vapors flow from the fuel injectors to the adsorber means. When the engine is shut down, fuel pressure in the accumulator drops below a predetermined level and the check valves 70 are automatically closed by their springs to thereby seal the fuel injectors from the accumulator. Valves 180 and 192 are then opened simultaneously, it being understood that opening and closing operation of all of the valves is controlled by the ECM. Fuel vapors trapped in the fuel injectors flows from the fuel injectors into the adsorber means where the fuel vapors are adsorbed by the activated charcoal.

When the engine is restarted, valves 180 and 192 are simultaneously closed. There is then a time delay while the engine is idling and the associated vehicle is not moving. When the vehicle begins to move, valves 186 and 192 are opened simultaneously so that purge air flows through the adsorber means and the adsorbed fuel vapors flow to the air inlet of the engine where they are burned so that undesired emissions are reduced to a minimum. The purge process continues for a period of about two to five minute to ensure that substantially all of the adsorbed fuel vapors are burned at the air inlet of the engine.

Then valves 186 and 192 are closed simultaneously to interrupt the flow of purge air. Valves 180, 186 and 192 then remain closed and the leakage control system remains inactive while the engine is running. When the engine shuts down again, check valves 70 and valves 180, 186 and 192 then recycle through the same sequence of operation described above.

The invention has been described with reference to a preferred embodiment. Obviously, various modifications, alterations and other embodiments will occur to others upon reading and understanding this specification. It is our intention to include all such modifications, alterations and alternate embodiments insofar as they come within the scope of the appended claims or the equivalent thereof.

What is claimed is:

1. An internal combustion engine with low viscosity fuel system comprising, a combustion cylinder, a fuel injector for injecting liquid fuel into said cylinder, a fuel tank for receiving fuel therein, means for pressurizing said tank to maintain fuel within said tank in its liquid phase, an accumulator connected to said tank for receiving liquid fuel from said tank and being connected to said injector to provide liquid fuel to said injector, a control valve for controlling liquid flow from said accumulator to said injector, and a leakage control system including a check valve for preventing fuel from flowing from said accumulator to said injector when the pressure of the liquid fuel in said accumulator drops below a predetermined level, each of said check valves including a valve seat, a soft high strength ball, said ball conforming to said valve seat when the valve is closed to provide a pressure tight seal, said check valve having a diameter and being adapted to engage said seat to close the valve, a piston having a face engaging said ball, said face being circular and having a diameter greater than the diameter of said ball, and resilient means biasing said piston and said ball into closed position with a force which requires liquid fuel pressure above said predetermined level before the check valve opens.

2. An engine as defined in claim 1 wherein said leakage control system includes fuel vapor adsorbing means connected to said injector for receiving and adsorbing fuel vapor from said injector when the engine is stopped.

3. An engine as defined in claim 2 including a dump valve for controlling the flow of fuel vapors from said injector to said adsorbing means, said engine having an air inlet, said adsorbing means also being connected to said engine air inlet, and an air inlet valve for controlling the flow of fuel vapors to said air inlet.

4. An engine as defined in claim 3 including a source of purge air connected to said adsorbing means, and a purge valve for controlling the flow of purge air into said adsorbing means.

5. An internal combustion engine with low viscosity fuel system comprising, a plurality of combustion cylinders, a fuel tank for receiving fuel therein, means for pressurizing said tank to maintain fuel within said tank in its liquid phase, an engine driven fuel pump having an inlet and an outlet, said pump inlet being connected to said tank for receiving liquid fuel from said tank, an accumulator connected to the outlet of said pump for receiving liquid fuel from said pump and being connected to each of said injectors to provide liquid fuel to said injectors, a plurality of control valves for controlling flow of liquid fuel from said accumulator to each of said injectors, a leakage control system including a plurality of check valves, each of said check valves being connected between one of said control valves and one of said injectors for controlling flow of liquid fuel to said injectors when the pressure of the liquid fuel in said accumulator drops below a predetermined level, and a plurality of flow restrictors connected to the inlet of said pump, each flow restrictor being connected to one of said control valves and one of said check valves downstream of the associated control valve and upstream of the associated check valve, each of said check valves including a valve seat, a soft high strength ball, said ball conforming to said valve seat when the valve is closed to provide a pressure tight seal, said check valve having a diameter and being adapted to engage said seat to close the valve, a piston having a face engaging said ball, said face being circular and having a diameter greater than the diameter of said ball, and resilient means biasing said piston and said ball into closed position with a force which requires liquid fuel pressure above said predetermined level before the check valve opens.

6. An engine as defined in claim 5 wherein said leakage control system includes fuel vapor adsorbing means connected to each of said injectors for receiving and adsorbing fuel vapor from said injectors when the engine is stopped, and a dump valve for controlling the flow of fuel vapor to said adsorbing means from said injectors.

7. An engine as defined in claim 5 wherein said leakage control system includes fuel vapor adsorbing means having an inlet and an outlet, said inlet being connected to said injectors.

8. An engine as defined in claim 7 wherein said engine has an air inlet, the outlet of said adsorbing means being connected to said engine air inlet, and an engine air inlet valve for controlling the flow of fuel vapors from the outlet of said adsorbing means to said air inlet.

9. An engine as defined in claim 7 including a source of purge air, the inlet of said adsorbing means being connected to said source of purge air, and a purge valve for controlling the flow of purge air from said source of purge air to the inlet of said adsorbing means.

10. An engine as defined in claim 5 wherein said leakage control system includes fuel vapor adsorbing means having an inlet and an outlet, said inlet being connected to said injectors, a dump valve controlling the flow of fuel vapors from said injectors to said adsorbing means, a source of purge air being connected to said inlet, a purge valve for controlling the flow of purge air from said source of purge air to said inlet, said engine having an air inlet connected to said outlet, an air inlet valve controlling the flow of fuel vapors from said outlet to said engine air inlet, said engine including an electronic control module that is programmed with the operating strategy of the engine and receives inputs from engine monitors and send signals to control the operation of said dump valve, purge valve and air inlet valve.

11. The method of operating an internal combustion engine using low viscosity fuel comprising, storing low viscosity fuel in a fuel tank, pressurizing said tank, pumping fuel from said tank to an accumulator, controlling the flow of fuel from the accumulator to injectors at the combustion cylinders of the engine by electronically actuated control valves, providing a short circuit conduit for fuel that has leaked past said control valve to return to be pumped back to the accumulator, restricting the flow of fuel through said short circuit, actuating said electronically actuated valves in timed sequence and for predetermined durations to initiate fuel flow to said injectors, and when the engine is shut down, sealing off communication between said control valves and said injectors while providing communication between said injectors and an adsorbing means as well as providing communication between said adsorbing means and an air inlet means, whereby fuel vapors from said injectors are adsorbed by said adsorbing means.

12. The method as defined in claim 11 including the step of subsequently restarting the engine and providing communication between said control valves and said injectors while preventing communication between said injectors and said adsorbing means as well as preventing communication between said adsorbing means and said air inlet means.

13. The method as defined in claim 12 including the step of subsequently providing communication between a source of purge air and said adsorbing means as well as providing communication between said adsorbing means and said air inlet means and purging fuel vapors from said adsorbing means.

14. The method as defined in claim 13 including the step of subsequently preventing communication between said source of purge air and said adsorbing means as well as preventing communication between said adsorbing means and said air inlet means.

* * * * *